(12) United States Patent
Allidieres et al.

(10) Patent No.: US 8,671,997 B2
(45) Date of Patent: *Mar. 18, 2014

(54) DEVICE AND METHOD FOR FILLING A CONTAINER WITH A GAS UNDER PRESSURE

(75) Inventors: Laurent Allidieres, Saint Martin d'Uriage (FR); Thomas Charbonneau, Quebec (CA); Sebastian Sequeira, Vourey (FR); Thomas Vinard, Sassenage (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 655 days.

This patent is subject to a terminal disclaimer.

(21) Appl. No.: 12/400,937

(22) Filed: Mar. 10, 2009

(65) Prior Publication Data
US 2009/0229701 A1 Sep. 17, 2009

(30) Foreign Application Priority Data
Mar. 11, 2008 (FR) ..................................... 08 51560

(51) Int. Cl.
| B65B 1/20 | (2006.01) |
| B65B 3/18 | (2006.01) |
| F28F 27/02 | (2006.01) |
| F28D 7/02 | (2006.01) |
| F17C 3/08 | (2006.01) |

(52) U.S. Cl.
USPC ............. 141/82; 141/104; 165/103; 165/164; 62/45.1

(58) Field of Classification Search
USPC ............... 141/82, 104; 62/45.1; 165/164, 103
See application file for complete search history.

(56) References Cited

U.S. PATENT DOCUMENTS 3,693,711 A * 9/1972 Zygiel ........................... 165/164
4,044,825 A * 8/1977 Gugenberger et al. ........ 165/165
(Continued)

FOREIGN PATENT DOCUMENTS

FR 2891347 3/2007

OTHER PUBLICATIONS

Incropera, DeWitt, Bergman, Lavine; Fundamentals of Heat and Mass Transfer; sixth edition; 2007; John Wiley & sons, p. 929 (one page).*

(Continued)

*Primary Examiner* — Ryan Reis
(74) *Attorney, Agent, or Firm* — Christopher J. Cronin

(57) ABSTRACT

Device for filling a container with a gas under pressure comprising at least one source of gas pressurized to a first pressure, a transfer circuit capable of selectively connecting the source or sources of pressurized gas to the tank to be filled, the transfer circuit comprising control members for controlling the flow of the gas from the source or sources to the tank, the transfer circuit further including at least one cooling exchanger for cooling the pressurized gas comprising a hot flow circuit for the pressurized gas to be cooled, a cold flow circuit for a cold cooling fluid, and a refrigeration hold-over medium being in direct heat exchange with the cold fluid of the cold circuit and with the pressurized gas to be cooled of the hot circuit, in order to selectively carry out indirect heat exchange between the pressurized gas and the cold fluid, wherein the refrigeration hold-over medium forms and fills a gap between the cold fluid of the cold circuit and the pressurized gas of the hot circuit, the gap having a thickness of greater than 5 mm and preferably between 20 and 50 mm.

7 Claims, 4 Drawing Sheets

(56) References Cited

U.S. PATENT DOCUMENTS

| | | | |
|---|---|---|---|
| 4,156,625 A * | 5/1979 | Wachendorfer, Sr. | 156/245 |
| 6,253,837 B1 * | 7/2001 | Seiler et al. | 165/103 |
| 6,810,924 B2 * | 11/2004 | White | 141/82 |
| 7,128,103 B2 * | 10/2006 | Mitlitsky et al. | 141/248 |
| 2005/0132719 A1 * | 6/2005 | Svensson et al. | 62/50.1 |
| 2006/0016512 A1 * | 1/2006 | Takano et al. | 141/82 |
| 2006/0180240 A1 * | 8/2006 | Niedzwiechi et al. | 141/231 |
| 2010/0044020 A1 * | 2/2010 | Kojima | 165/154 |

OTHER PUBLICATIONS

Search Report for FR 0851560, Sep. 12, 2008.

\* cited by examiner

DEVICE AND METHOD FOR FILLING A CONTAINER WITH A GAS UNDER PRESSURE

This application claims priority to French Patent Application FR 0851560 filed Mar. 11, 2008, incorporated herein in its entirety.

FIELD OF INVENTION

The present invention relates to a device and a method for filling a container with a gas under pressure. The invention relates in particular to the filling of vehicle tanks with gaseous hydrogen.

BACKGROUND OF THE INVENTION

The storage of gaseous hydrogen at high pressures is particularly important for its use in automobiles. In addition, in this application in particular, the relative rapidness with which a tank is filled is an important factor. Specifically, the operation of filling hydrogen tanks on board vehicles having a fuel cell or an internal combustion engine operating on hydrogen must be able to be carried out in at most a few minutes. The filling must be carefully controlled since rapid pressurization of the gas causes heating, which may become incompatible with the constituent material of the tank (for example temperatures above 85° C.).

To solve this problem, one solution consists of controlling the rate of filling according to the temperature of the gas in the tank. However, this solution has the drawback of lengthening the time to fill the tank.

Another solution consists of providing a refrigeration unit in the filling station. However, this solution requires substantial and costly infrastructures, in particular in terms of electrical energy. Specifically, according to that method, the gas is precooled before it enters the tank, typically down to temperatures of between −45° C. and 0° C. in order to prevent the upper limit of the temperature operating range of this tank from being reached during filling. In this regard, the reader may refer to the document FR 2 891 347 A1 which describes an inexpensive solution for carrying out this precooling.

To effect the precooling, the general practice is to use a heat exchanger cooled by a cold source such as a bath of glycol-water solution or of liquid nitrogen. However, in certain situations, precooling the pressurized gas is difficult to control at low cost. This is because, owing to the variations in instantaneous heat exchange power, instabilities in the temperature of the cooled pressurized gas are observed. Moreover, the known heat exchange means are relatively bulky.

Accordingly, there is a need for a device/method which alleviates all or some of the drawbacks of the prior art mentioned above.

SUMMARY OF THE INVENTION

The present invention provides a device for filling a container with a gas under pressure, comprising at least one source of gas pressurized to a first pressure, called high pressure, a transfer circuit capable of selectively connecting the source or sources of pressurized gas to the tank to be filled, the transfer circuit comprising control members for controlling the flow of the gas from the source or sources to the tank, the transfer circuit further including at least one cooling exchanger, for cooling the pressurized gas. More specifically, the present invention provides a device for filling a container with a gas under pressure, especially hydrogen in a tank of a vehicle, comprising at least one source of gas pressurized to a first pressure, called high pressure, a transfer circuit capable of selectively connecting the source or sources of pressurized gas to the tank to be filled, the transfer circuit comprising control members for controlling the flow of the gas from the source or sources to the tank, the transfer circuit further including at least one cooling exchanger, for cooling the pressurized gas, wherein the cooling exchanger comprises a hot flow circuit for the pressurized gas to be cooled, a cold flow circuit for a cold cooling fluid, and a refrigeration hold-over medium, the refrigeration hold-over medium being in direct heat exchange, on the one hand, with the cold fluid of the cold circuit and, on the other hand, with the pressurized gas to be cooled of the hot circuit, in order to selectively carry out indirect heat exchange between the pressurized gas and the cold fluid via the refrigeration hold-over medium, and wherein the refrigeration hold-over medium forms and fills a gap between the cold fluid of the cold circuit and the pressurized gas of the hot circuit, the gap having a thickness of greater than 5 mm and preferably between 20 and 50 mm. The present invention also provides a method for filling a container with a gas under pressure.

BRIEF DESCRIPTION OF THE FIGURES

Other features and advantages will become apparent on reading the following description, with reference to the figures in which.

DETAILED DESCRIPTION OF THE INVENTION

Figure 1:
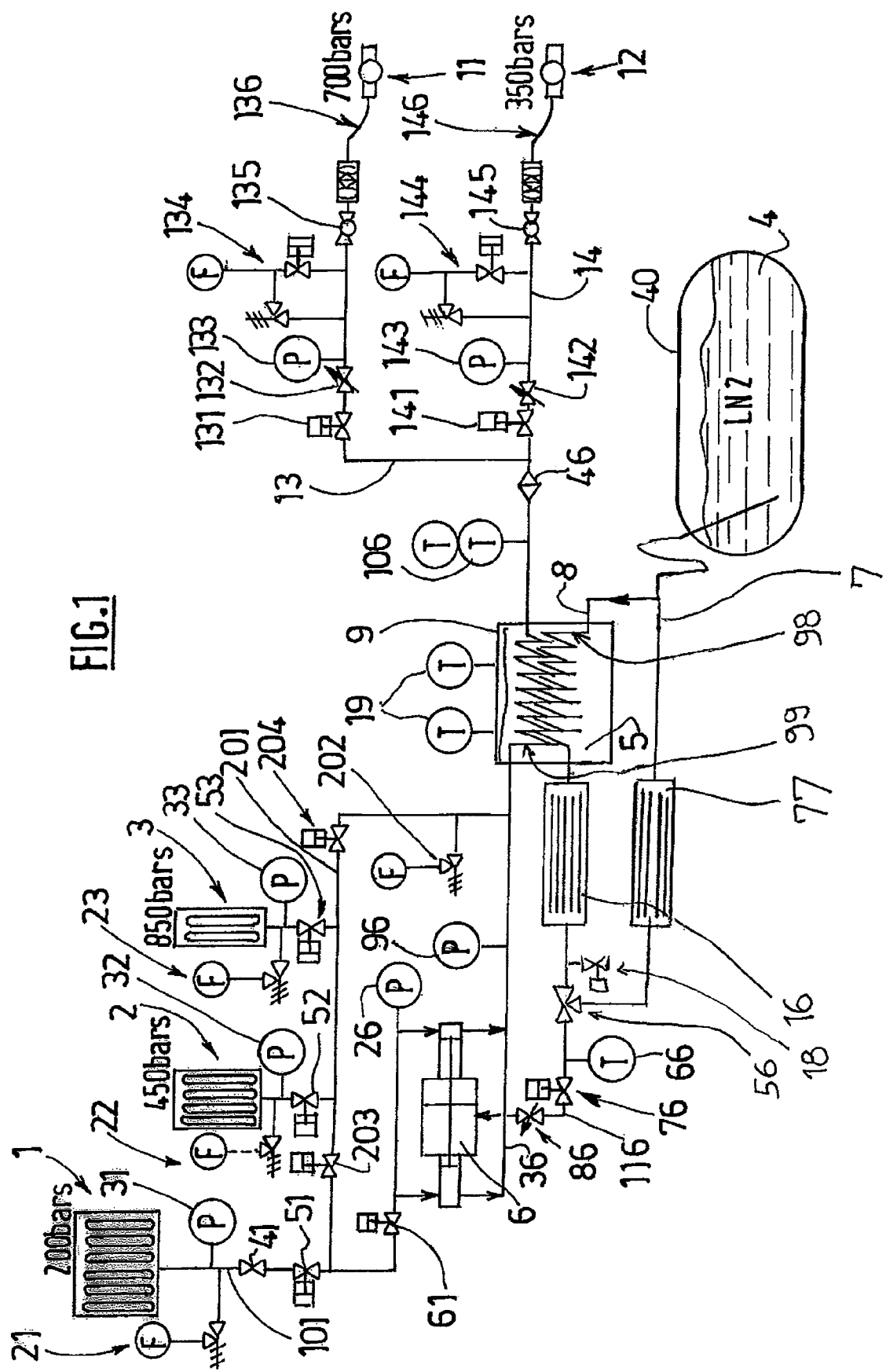
FIG. 1 shows a schematic view illustrating the structure and the operation of an example of a filling device according to the invention.

The device according to the present invention, which is consistent with the definition given in the above preamble, is essentially one in which the cooling exchanger comprises a hot flow circuit for the pressurized gas to be cooled, a cold flow circuit for a cold cooling fluid, and a refrigeration hold-over medium, the refrigeration hold-over medium being in direct heat exchange, on the one hand, with the cold fluid of the cold circuit and, on the other hand, with the pressurized gas to be cooled of the hot circuit, in order to selectively carry out indirect heat exchange between the pressurized gas and the cold fluid via the refrigeration hold-over medium, and in which the refrigeration hold-over medium forms and fills a gap between the cold fluid of the cold circuit and the pressurized gas of the hot circuit, the gap having a thickness of greater than 5 mm.

The invention therefore serves especially to guarantee very good temperature stability of the pressurized gas at the exchanger outlet, despite the high and fluctuating instantaneous heat exchange power.

The invention makes it possible in particular to increase the specific heat and the conductivity of the exchanger compared with the known systems, while at the same time being more compact.

Moreover, embodiments of the invention may comprise one or more of the following features:
the refrigeration hold-over medium comprises at least one of the following: a mass of aluminum, a mass of stainless steel, a mass of copper or a mass of lead;

the refrigeration hold-over medium has a specific heat per unit mass (density×specific heat at constant pressure) of between 2000 and 4000 $kJ.m^{-3}.K^{-1}$ and a thermal conductivity of between 150 and 400 W/m.K;

the cold circuit of the exchanger is selectively connected to a tank of cryogenic fluid such as liquid nitrogen or $CO_2$;

the refrigeration hold-over medium is in contact with a tube or tubes of the hot circuit through which the pressurized gas to be cooled flows;

the refrigeration hold-over medium comprises a mass of aluminum, assembled in the exchanger by high-temperature casting in liquid form in order to increase the thermal contact between, on the one hand, the tube or tubes of the hot circuit for the pressurized gas and, on the other hand, the aluminum, or the tubes are bored in the mass of metal; and the transfer circuit comprises a valve and a selective bypass circuit portion of at least one part of the cooling exchanger for controlling the temperature of the hydrogen.

The invention also relates to a method for filling a container with a gas under pressure, especially hydrogen in a tank of a vehicle, comprising the transfer of a gas pressurized to a pressure called the high pressure from a source to the tank to be filled, the method including a step of pre-cooling the pressurized gas before it enters the tank down to a target temperature by indirect heat exchange with a cooling fluid via a refrigeration hold-over medium, the refrigeration hold-over medium being cooled by heat exchange with the cooling fluid at least prior to the transfer of pressurized gas to the tank, i.e. prior to the flow of the pressurized gas, the refrigeration hold-over medium being selectively cooled by heat exchange with the cold cooling fluid circuit.

According to one advantageous feature of the invention, during a transfer of pressurized gas to the tank to be filled, i.e. a flow of pressurized gas from the source to the tank to be filled, the cooling fluid is simultaneously made to flow, for heat exchange with the refrigeration hold-over medium, with a specified flow rate, this cooling fluid flow rate corresponding to a cooling power of less than the instantaneous cooling power needed to cool the amount of pressurized gas flowing during the transfer down to the target temperature, the lacking cooling power differential being provided by the pre-cooled refrigeration hold-over medium.

Moreover, embodiments of the invention may comprise one or more of the following features:

the flow rate of cooling fluid allowed to flow during a transfer of pressurized gas is zero or approximately zero, the cooling power for cooling the pressurized gas down to the target temperature being essentially provided by the pre-cooled refrigeration hold-over medium;

the source comprises at least one tank of pressurized gas and at least one compressor actuated by a working fluid, the cooling fluid constituting said working fluid of the compressor;

during the pre-cooling step, the temperature of the gas is maintained within a temperature range not exceeding the target temperature by more than a few degrees (5° C.); and during a transfer of pressurized gas (filling step), the temperature of the refrigeration hold-over medium is kept constant with a limited variation (for example 5° C.).

In the example shown, the device comprises three gas tanks or containers 1, 2, 3. A first container 1 is, for example, a hydrogen reserve, the hydrogen being bottled at a pressure of 200 bar (or 300 bar or the like), serving as hydrogen supply. The first container 1 is for example a main source of hydrogen intended to feed tanks 11, 12. For example, the first container 1 is a mobile station designed to be filled with hydrogen on a production site. Of course, the first container 1 may be stationary and/or associated with a stationary or mobile hydrogen production unit.

The second and third containers 2, 3 are, for example, buffer tanks or sets of buffer cylinders used when filling with conventional cascaded equalizing phases. For example, the second container 2 may be intended to store hydrogen at a pressure of about 450 bar whereas the third container 3 stores hydrogen at a pressure of about 850 bar.

The outlet of each container 1, 2, 3 is connected to a respective safety vent 21, 22, 23 capable of allowing the gas to be vented to the atmosphere. The outlet of each container 1, 2, 3 includes respective pressure sensors 31, 32, 33.

The outlet of the first container 1 (hydrogen source) is connected via a line 101 to a compressor 6 so as to feed the latter with gas intended to be compressed. The line 101 feeding the compressor 6 with gas has three valves 41, 51, 61 connected in series. A pressure sensor 26 is also provided for measuring the pressure of the gas at the inlet of the compressor 6.

The line 101 feeding the compressor 6 with gas includes a first branch line 201 that connects the first container 1 directly to the output line 36 of the compressor (i.e. the line 36 that contains the gas pressurized in the compressor 6). The first branch line 201 is connected to the feed line 101 between the series-connected second and third valves 51, 61 and includes a safety vent 202.

The outlets of the second and third buffer containers 2, 3 are each connected to the first branch line 201 via a respective valve 52, 53. The first valve 203 is placed on the first branch line 201 between the connection to the feed line 101 and the connection of the second buffer container 2. The second valve 204 is placed on the first branch line 201 between the connection of the third buffer container 2 and the connection of the feed line 101 to the output line 36 of the compressor 6.

The output line 36 of the compressor 6 includes pressure sensors 96 for measuring the pressure of the gas output by the compressor 6. The output line 36 of the compressor then passes through a heat exchanger 9, described in greater detail below, which serves to cool the compressed gas before it enters a tank 11, 12. Downstream of the exchanger 9, the output line 36 of the compressor is provided with temperature sensors 106 for measuring the temperature of the compressed gas and with a particulate filter 46. Downstream of the filter 46, the output line 36 is subdivided into two parallel lines 13, 14 each able to be connected to a respective tank 11, 12 of a vehicle, in order to deliver compressed gas (hydrogen) to said tank, said compressed gas coming selectively either directly from the compressor 6 or from a buffer container 1, 2 and 3. As a variant it is possible for the installation to include just one connecting line 13 or 14, for example if the station allows filling only at a single preferential pressure.

Each connecting line 13, 14 includes, respectively, from the upstream end to the downstream end (the downstream end being the tank 11, 12 to be filled), a first valve 131, 141, then a calibrated orifice, such as a manual or controlled needle valve 132, 142, and a pressure sensor 133, 143. Each connecting line 13, 14 then includes a double venting device 134, 144 (an automatic safety vent and a vent via a valve). The venting devices are used, should the need arise, to exhaust the gas (hydrogen) to the outside of the circuit, for example to the atmosphere.

Downstream of the double venting device 134, 144, each line 13, 14 includes an emergency stop valve 135, 145 and finally a system 136, 146 that can be coupled to a receiving device on a tank (for example a hose 136, 146 terminating in a quick connect/release coupling, which can be connected to an inlet orifice of the tank 11, 12). Each connecting line 13, 14 may be designed to deliver gas at a defined pressure (for example 700 bar and 350 bar respectively).

The compressor 6 is preferably a pneumatically controlled linear piston compressor capable of pressurizing up to 1300 bar (preferably to a minimum 890 bar). The compressor 6 is conventionally fed with a working gas, which delivers the compression energy via a supply line 116, the upstream end of which is connected to a working gas source 40. The working gas is used for example to displace one or more pistons in the body of the compressor 6.

Preferably, the working gas 4 is nitrogen stored in a cooled form within the source 40. The nitrogen is preferably stored in liquid form (cryogenic nitrogen) in the source tank 40. The liquid nitrogen 4 is drawn from its source tank 40 for example by means of a dip tube or the like.

At the outlet of the nitrogen source 40, the supply line 116 comprises a portion divided into two parallel lines 7, 8. The first line 8 includes a first heat exchanger 9 and a second heat exchanger 16. The second line 7 by-passes circuits the first heat exchanger 9 and rejoins the first line 8 downstream of the second heat exchanger 16. The second line 7 includes a third heat exchanger 77. Advantageously, the heat exchangers 16 and 77 may be grouped together into one and the same unit.

The first and second series-connected heat exchangers 9 and 16 in the first line 8 are intended to heat the fluid output by the source 40 for the purpose of obtaining gas. A device 18 for venting the working gas to atmosphere, for example via a valve, is provided downstream of the two heat exchangers 9, 16.

The splitting of the gas between the first line 8 and the second line 7 takes place for example by means of a three-way valve 56. Downstream of the second heat exchanger 16, the supply line 116 comprises a temperature sensor 66, for measuring the temperature of the working gas traveling to the compressor 6, and two series-connected valves 76, 86 which are intended to cut off the inflow of working gas to the compressor 6 (and therefore to stop the compressor) and to regulate the flow rate of working gas (and therefore to regulate the compression rate), respectively.

The first heat exchanger 9 of the first line 8 constitutes the heat exchanger 9 located on the output line 36 of the compressor 6—i.e. the first heat exchanger 9 permits heat exchange between the working fluid (nitrogen) 4 and the compressed gas at the outlet of the compressor 6 or output by the containers 1, 2 or 3. In this way, the first heat exchanger 9 serves to cool the compressed gas, by creating a heat exchange with the cooler working fluid. Typically, the temperature of the compressed gas at the outlet of the compressor 6 is around 60 to 80° C. The temperature of the gas at the outlet of the containers 1, 2 or 3 is approximately equal to the ambient temperature, whereas the temperature of the working fluid at the outlet of the source is around −196° C.

This heat exchange between the working fluid and the compressed gas may in particular be used to heat up the working fluid 4 at the outlet of the source 4 for the purpose of evaporating it so as to cool a refrigeration capacity 5 of the heat exchanger 9, preferably consisting of a mass of aluminum.

Preferably, the first heat exchanger 9 exchanges heat between the compressed gas and the working fluid 4 indirectly, i.e. via a refrigeration hold-over medium or vector 5. For example, the heat exchanger 9 may include for this purpose a refrigeration hold-over medium 5 such as a mass of aluminum, or any other equivalent means. The refrigeration hold-over medium 5 is preferably designed in such a way that its temperature is substantially uniform over the duration of at least one filling of a tank 11, 12.

Figure 8:
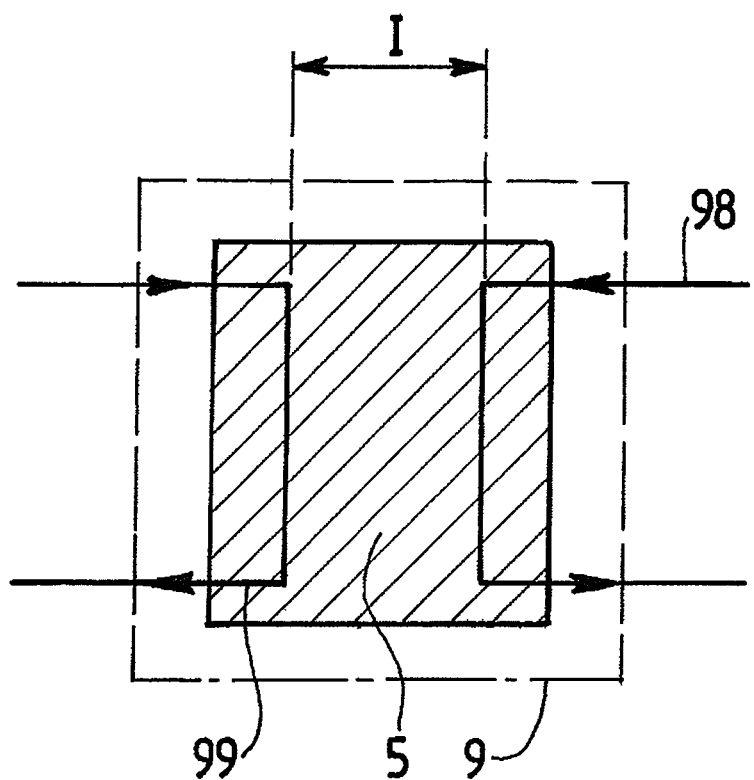
FIG. 8 shows a schematic view of a detail of FIG. 1, illustrating the structure and the operation of an example of a cooling exchanger according to the invention.

As shown in FIG. 8, the refrigeration hold-over medium 5 preferably forms and fills, at least partly, a gap I between the cold fluid of a cold circuit 98 (for the cooling fluid) and the pressurized gas of the hot circuit 99. Preferably, the gap I has a thickness of greater than 5 mm.

The refrigeration hold-over medium 5 preferably has a mass of around 300 kg, a specific heat per unit mass (density× specific heat at constant pressure) of between 2000 and 4000 kJ.m$^{-3}$.K$^{-1}$ and a thermal conductivity of between 150 and 400 W/m.K.

This type of configuration makes it possible, with a system made up for example of 300 kg of aluminum, to cool a 1 kg mass of hydrogen to between +30 and −30° C. while increasing the temperature of the aluminum mass only by 3° C. In this way, it may be seen that the inertia of the aluminum mass serves to cool the hydrogen and guarantee an almost constant temperature (±3° C.) of the hydrogen output by the exchanger during filling, without refrigeration input in the exchanger.

Advantageously, the refrigeration hold-over medium 5 is in contact with a tube or tubes of the hot circuit 99 in which the pressurized gas to be cooled flows. For example, the refrigeration hold-over medium 5 comprises a mass of aluminum assembled in the heat exchanger 9 by high-temperature casting in liquid form, the aluminum then cooling and solidifying, in order to increase the thermal contact between the tubes 99 in which the pressurized gas flows and the aluminum. The same heat exchange structure may be used between the hold-over medium 5 and the cold circuit 98.

The fluid may also flow in cavities bored in the aluminum mass.

The heat exchanger 9 may advantageously include temperature sensors 19 for measuring the temperature of the fluids and/or of the refrigeration hold-over medium 5 within the heat exchanger 9.

The second heat exchanger 16 of the first line 8 is also intended to complete the heat-up of the fluid output by the source 40 for the purpose of obtaining gas, for example by heat exchange with the external air, so as to be able to be possibly used in the compressor 6 as working fluid.

Thus, by appropriately controlling the valves 56, 18 of the supply line 116 it is possible to selectively distribute the fluid output by the source 40 so as to heat it in the exchangers 16 and 9 of the first line (and temperature-condition the refrigeration hold-over medium 5) or to heat it in the exchanger 77. Likewise, these valves 56, 18 are used to control the proportion of heated gas in this line 116, said gas being sent to the compressor 6 and/or to the outside (via the venting device 18). In this way, the device serves to regulate the thermal power of the working-fluid 4/compressed-gas heat exchanger 9 and the heating of said working fluid 4 for its possible use in the compressor 6, and to do this independently.

Preferably, the cooling of the compressed gas is designed to keep its temperature between −45° C. and the ambient temperature.

In this way, the working fluid (nitrogen in the illustrative example) is used to cool the gas (hydrogen in the example), and this same gas, when heated, may be used to operate at least one compressor 6.

Of course, the invention may also be applied to a device in which the cooling fluid 4 is not used as working fluid for a compressor, particularly for hydraulically controlled linear piston compressors or electrically controlled diaphragm compressors.

Figure 6:
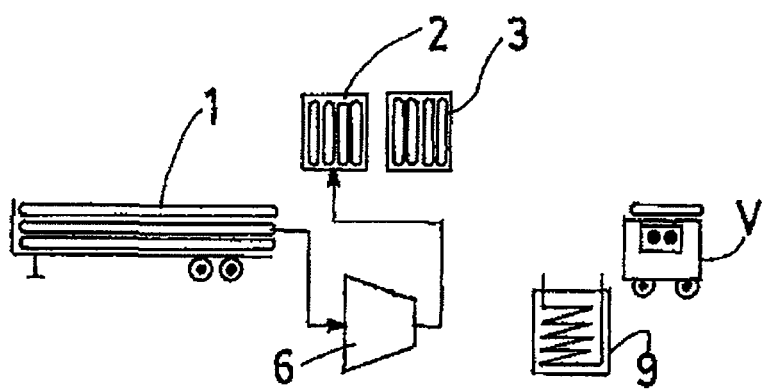
Figure 7:
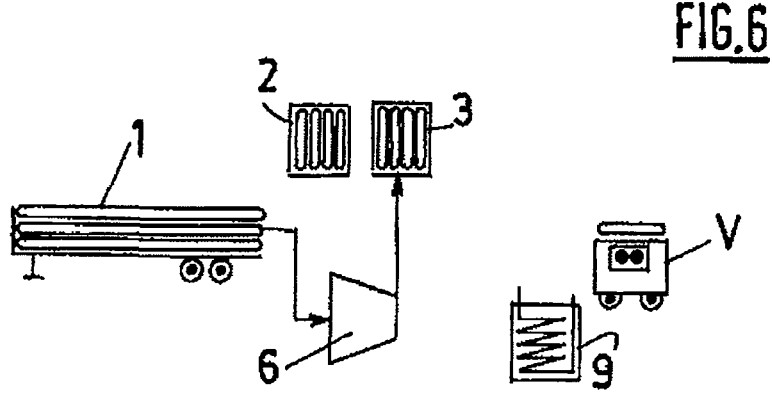

As will be described in greater detail below with reference to FIGS. 2 to 7, the transfer of heat to the working fluid in the exchanger 9 preferably takes place during a phase in which a container 2, 3 is being filled (FIGS. 6 and 7).

For the sake of simplification in FIGS. 2 to 7, only some of the constituent components of the device of FIG. 1 have been shown. The components identical to those described above with reference to FIG. 1 are denoted by the same numerical references, but they will not be described in detail a second time.

Moreover, the first container 1 is shown in the form of a hydrogen reserve on a mobile station (such as for example a semitrailer).

Figure 2:
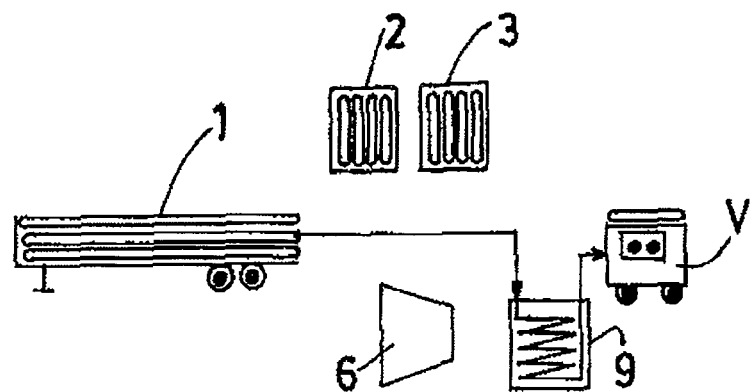
FIGS. 2 to 7 illustrate schematically six steps of an example of the use of the filling device of FIG. 1 respectively.
Figure 3:
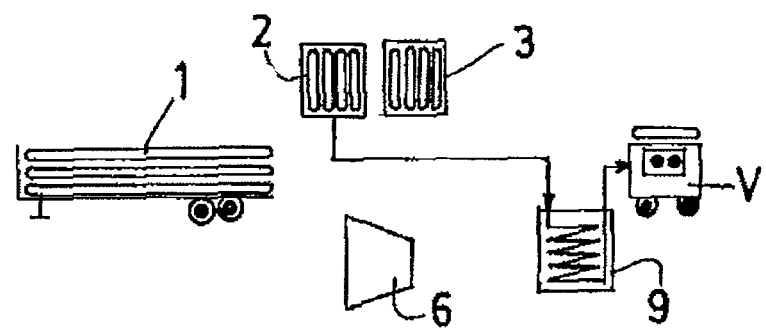
Figure 4:
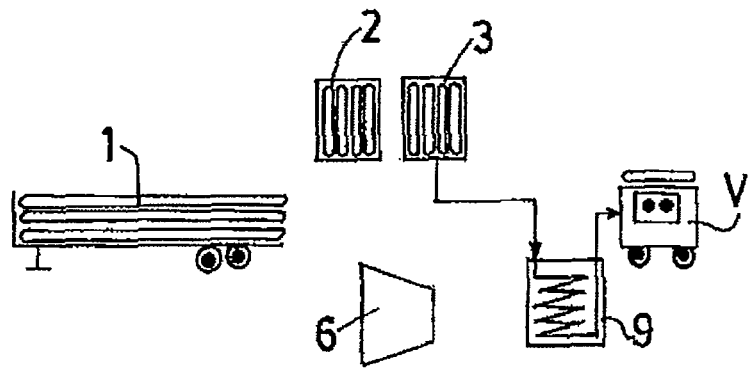
Figure 5:
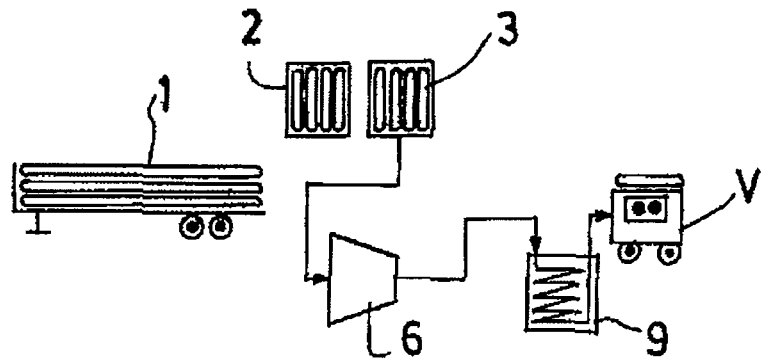

FIG. 2 shows step A in which the tank of a vehicle V is supplied, by pressure equalization and with precooling (in heat exchanger 9), with gas (hydrogen) stored in the first container 1 (for example at a pressure of 200 bar).

During step B (FIG. 3), for example after the equalization of step A, the tank of the vehicle V is supplied, by pressure equalization and with precooling (in heat exchanger 9), with gas stored in the second container 2 (for example at a pressure of 450 to 480 bar).

During step C (FIG. 4), for example after the equalization of step B, the tank of the vehicle V is supplied, by pressure equalization and with precooling (in heat exchanger 9), with gas stored in the third container 3 (for example at a pressure of around 850 bar).

During step D (FIG. 5), supplementary filling may be carried out, for example after the equalization of step C and with precooling (in heat exchanger 9), by supplying the tank of the vehicle V with compressed gas coming directly from the compressor 6 at a defined pressure. During this optional supplementary filling, the compressor 6 may be supplied with gas coming from the third container.

As shown in FIGS. 2 to 7, during all or some of steps A to E, the compressed gas may or may not be cooled in the hydrogen/working fluid heat exchanger 9 before its entry into the tank of the vehicle V.

During step E (FIG. 6), the second container 2 may be refilled with gas via the compressor 6 using gas coming from the first container 1.

During step F (FIG. 7), the third container 2 may also be refilled with gas via the compressor 6 using gas coming from the first container 1.

Preferably during steps E and F (FIGS. 6 and 7), the cryogenic nitrogen (working fluid) is used to cool the refrigeration hold-over medium 5 (aluminum mass) of the heat exchanger 9. The hold-over medium 5 is for example isolated at a temperature between −45° C. and the ambient temperature. After the nitrogen has evaporated, it may optionally be used as working fluid (or driving fluid) in the compressor 6. The working fluid 4 may thus have in addition to its first, refrigerating function, an optional second, energy vector function.

During steps A to D, the compressed hydrogen flows through the cooled heat exchanger 9.

The heat exchanger 9 may therefore be cooled:
beforehand during steps E and F as described above; or
simultaneously with the flow of compressed gas within it (steps A to D), by opening the valve of the working-gas venting device 18 of the second line 8 of the supply line 116; or
beforehand and simultaneously (steps A to F); or finally
during a station standby step (a step other than A to F).

Because of the improved cooling efficiency according to the invention, during a filling operation (transfer of pressurized gas), the cooling fluid 4 may simultaneously be allowed to flow through the heat exchanger 9 with a defined flow rate corresponding to a cooling power of less than the instantaneous cooling power needed to cool the amount of pressurized gas flowing during the transfer down to the target temperature.

The structure and the operation of the heat exchanger (pre-cooled refrigeration hold-over medium 5) provide in this case the lacking cooling power differential.

Depending on the case, during a filling operation, this flow of cooling fluid through the heat exchanger 9 may even be at least partly interrupted without compromising the stability of the pressurized-gas target temperature achieved.

The structure and the operation of the invention improve the performance of cold filling compared with the known solutions. In particular, the thermal contact resistance between the tube containing the pressurized gas to be cooled and the aluminum (hold-over medium 5) is zero or almost zero, thereby making it possible to cool down to very low temperatures with very good inertia and reduced volume (for example exchange area) compared with the known solutions in which the tube containing the pressurized gas is in contact with an LN2-type refrigerating fluid or water/glycol solution, resulting in a non-zero contact resistance. In the known case of cooling with a shell-tube heat exchanger in which the gas to be cooled flows in tubes and the refrigerant in an associated shell, it is necessary to provide a very high flow rate of refrigerant and the exchange areas must be very (excessively) large owing to the low thermal inertia of the system. In the case of known cooling with a pool heat exchanger (in a refrigerant bath), the heat exchange is less than according to the invention and the volume larger owing to the low density of the liquid compared with the metal. In addition, the refrigerant used, which must be liquid at a temperature below −40° C., is usually toxic (high content of glycol compounds) or has a pronounced greenhouse effect.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for filling a container with a gas under pressure, comprising the transfer of the gas pressurized to a pressure called the high pressure from a source to a tank to be filled, the method including a step of pre-cooling the pressurized gas before it enters the tank down to a target temperature by indirect heat exchange with a cooling fluid via a refrigeration hold-over medium, the refrigeration hold-over medium being cooled by heat exchange with the cooling fluid prior to the transfer of pressurized gas to the tank, the refrigeration hold-over medium being selectively cooled by heat exchange with a cold cooling fluid circuit, wherein the refrigeration hold-over medium forms and fills a gap between the cooling fluid of the cold cooling fluid circuit and the pressurized gas of a hot circuit, the gap having a thickness of greater than 5 mm, and wherein, during a transfer of pressurized gas to the tank to be filled, the cooling fluid is simultaneously made to flow, for heat exchange with the refrigeration hold-over medium, with a specified flow rate, this cooling fluid flow rate corresponding to a cooling power of less than an instantaneous cooling power needed to cool the amount of pressurized gas flowing during the transfer at any given moment down to the target temperature, the degree to which the cooling power of the cooling fluid flow rate is less than the instantaneous cooling power is provided by the pre-cooled refrigeration hold-over medium.

2. The method of claim 1, wherein the method is for filling the tank of a vehicle with hydrogen.

3. The method of claim 1, wherein the flow rate of cooling fluid allowed to flow during a transfer of pressurized gas is zero or approximately zero, the cooling power for cooling the pressurized gas down to the target temperature being essentially provided by the pre-cooled refrigeration hold-over medium.

4. The method of claim 1, wherein the source comprises at least one tank of pressurized gas and at least one compressor actuated by a working fluid, the cooling fluid constituting said working fluid of the compressor.

5. The method of claim 1, wherein during the pre-cooling step, the temperature of the gas is maintained within a temperature range not exceeding the target temperature by more than 5° C.

6. The method of claim 3, wherein during a transfer of pressurized gas, the temperature of the refrigeration hold-over medium is kept constant with a limited variation in temperature.

7. The method of claim 6, wherein the limited variation is about 5° C.

* * * * *